Aug. 8, 1933.  I. GROMETSTEIN  1,921,748
PERCOLATOR COFFEEPOT
Filed Sept. 17, 1929
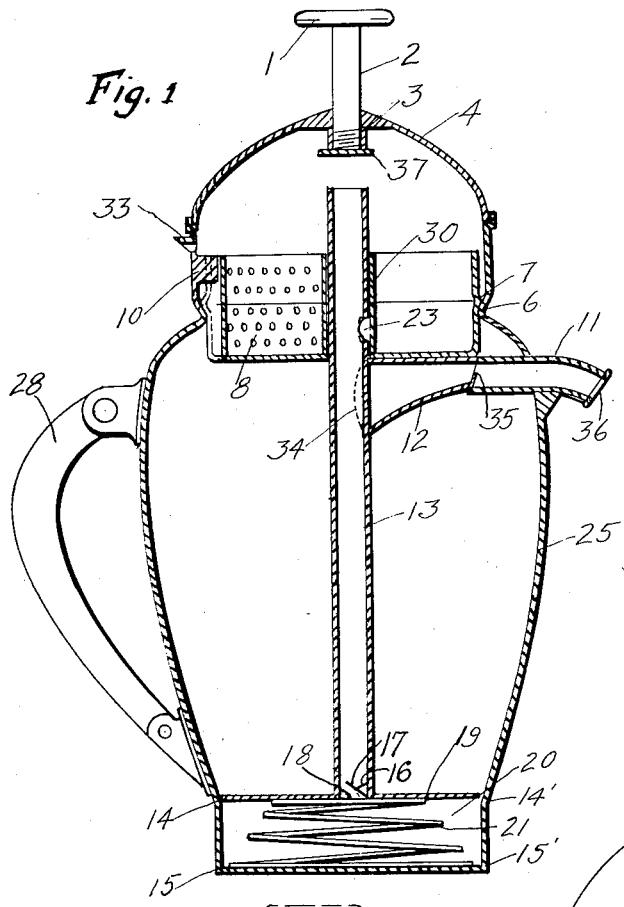
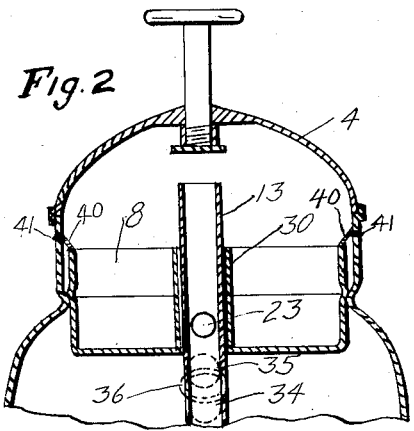
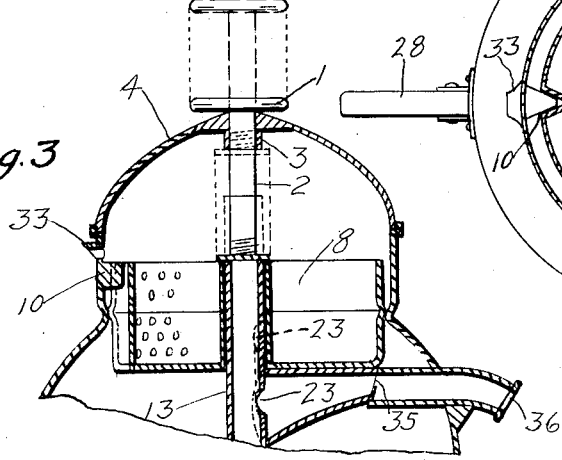
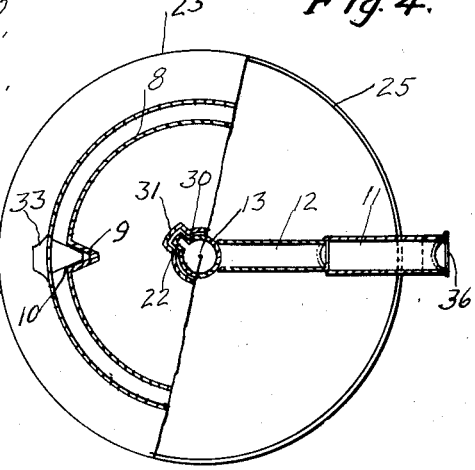
*Israel Grometstein*
INVENTOR.

Patented Aug. 8, 1933                                    1,921,748

UNITED STATES PATENT OFFICE 1,921,748

PERCOLATOR COFFEEPOT

Israel Grometstein, Bronx, N. Y.

Application September 17, 1929
Serial No. 393,249

9 Claims. (Cl. 53—3)

An object of the invention is to provide a percolator coffee pot, of the character described, the contents of which may be emptied without lifting the pot from wherever it may be resting. Another object of the invention is to provide a comparatively inexpensive percolator coffee pot of the character described, yet it is efficient, simple in operation and practical.

It is intended to construct many models of this percolator coffee pot of varying design and value, all however, embodying the same fundamental principles.

The invention consists of the features of construction, combination of elements and arrangement of parts, which will be exemplified in the construction hereinafter described, and of which the scope of application will be indicated in the following claims.

It is to be understood that the drawing is merely illustrative of the invention and not to be construed as limiting in any degree.

In the accompanying drawing,

Figure 1 is an elevational axial cross-sectional view of a percolator coffee pot embodying the invention.

Figure 2 is a fragmentary elevational axial cross-sectional view of the percolator embodying the invention as shown by the dotted lines.

Figure 3 is a fragmentary elevational axial cross-sectional view of a percolator embodying the invention with its parts in two different positions.

Figure 4 is a top plan view with parts broken away to show the interior construction of the percolator coffee pot.

Similar letters refer to similar parts throughout the drawing.

Now then it is the object of my invention to build a coffee percolator containing a filter cup 8, whose sides and bottom are perforated to permit liquids to filter through into the coffee pot proper. This filter cup 8 is mounted in the coffee pot 25 by means of flanges 7, Figure 1, which rest on shoulders 6 of the pot 25.

There is an upright sleeve 30 in the middle of the filter cup 8, which consists of a hollow vertical tube of rugged construction, which may be either an integral part of said filter cup, or may be permanently fastened to the filter cup by any mechanical means, as by soldering, welding, riveting etc. This sleeve 30 is constructed with a groove 31 in it Figure 4, so that another hollow tube 13, which passes through the tube 30 and which is capable of being vertically reciprocated, may be inserted into the sleeve 30 only when a corresponding tongue 22, in the tube 13, meshes with the groove 31. The inner surface of the tube 30 and outer surface of tube 13 are polished to a very smooth surface, so as to create a minimum of friction when the tube 13 is reciprocated.

To the lower extremity of the tube 13 a metal disc or piston 19 having a hole 18 therein is attached. Hole 18 is closed by a hinged check valve 17 having a stop 16 thereon.

The hollow tube 13 has an orifice 23, in its wall, the object of which will be later described.

Now, on the undersurface of the filter cup 8 is another hollow tube 12. This tube 12 lies horizontally, its direction being from the center of the filter cup towards the circumference of the filter cup. This tube 12 is rather wide near the disc forming the undersurface of the filter cup 8, but the outer part of the tube 12 tapers so that its outside diameter is just slightly less than the inside diameter of the nozzle 11, of the pot 25 at the point 35 where they both meet. The spout or nozzle 11 of the pot 25 protrudes a distance within the pot and the outer part of the tube 12 rests on an extension of the nozzle.

The body of the pot 25 is so constructed that it has a lower cylindrical extremity; then its walls flare outward and form a graceful curve, its lines converging towards the upper extremity to form the shoulders 6, from where the lines of the body again go outward and upward forming the neck of the pot, on which the cover 4 rests.

A spring 21 is attached to the undersurface of the piston 19. This spring 21 rests on the bottom of the pot and in its normal position, when no pressure is exerted on it, the spring 21 serves to keep the piston 19 just slightly above the line 14—14' which forms the upper extremity of the cylindrical lower portion of the pot. The cylindrical lower portion of the pot 14—14' to 15—15' we shall call the compression chamber. The line 14—14', that is the upper extremity of the lower cylindrical portion of the pot, and the piston 19 act as a valve, permitting or inhibiting liquids in the upper portion of the body of the pot from entering the compression chamber.

The pot 25 is constructed with a tongue 10 in its neck, which meshes with a recess 9 in the side of the filter cup 8, when the filter cup is in position in the pot.

The object of the tongue 10 and recess 9 in the body of the pot and side of the filter cup 8 respectively is to provide mechanical means for enforcing the tube 12 to point in the direction of the nozzle 11, and to engage this nozzle when the filter cup is inserted into the pot.

The object of the tongue 22 and the groove 31 in the tube 13 and sleeve 30 respectively, is to provide mechanical means for forcing the orifice 23 in the wall of the tube 13 to face in the direction of the tube 12. Thus communication is established between the hollow tube 13 and spout 11.

A push rod 2 passes through the top of the cover 4 of the pot. This push rod consists of a heat insulated top or button 1, a solid dowel piece 2 and a threaded lower extremity 37. The top of the cover, through which the push rod passes, is provided with a corresponding thread 3. These threads are of very steep pitch.

In the neck of the pot, spring pieces 40 are used for keeping the filter cup 8 free from vertical play.

When the tube 13 is in position in its sleeve 30, the orifice 23 works as a sleeve valve, and is "closed" when enclosed by the tube 30. When pressure is exerted on push rod 2, the hollow push rod 13 is forced downward and the orifice is then brought clear of the sleeve 30, that is, below the sleeve 30, and is then "opened", and the inside of the tube 13 communicates with the nozzle 11, through the medium of the orifice 23 and the hollow tube 12. While sleeve 30 snugly embraces tube 13, it allows 13 to be reciprocated in a vertical direction through the sleeve 30.

The construction of the intermediary tube 12 is such that the orifice valve 23 may empty contents into it during the entire downward stroke of the piston rod 13; at the same time its construction permits it to act as a trap for any leakage that may seep out of the orifice 23 during percolation.

The orifice valve 23 is in such a position in tube 13 that it would open just before liquids in tube 13 reach the top of the hollow piston rod 13.

The operation of the percolator is as follows:

Pour water into the pot up to about an inch below where the bottom of the filter cup will be when it is mounted in the percolator. Now insert the piston rod with its piston and spring attached into the pot, so that the orifice faces the spout 11. Place ground coffee beans into the filter cup and insert the cup into the pot, so that 22 and 31 mesh and so that 9 and 10 mesh, place the cover on the pot, pulling push rod 2 up and giving it a quarter turn, so that the threads will engage and keep the bottom of the push rod clear of the tube 13. Now, allow the contents of the pot to boil, by placing it over a flame or on a stove. It is also intended to manufacture models with means for electrically heating the contents of the percolator coffee pot.

As the water in the pot boils, it will rise in the tube 13 and will spray over its top into the filter cup 8. It is intended to make the cover of glass or metal and glass construction so that the percolating operation will be visible.

Excess steam generated by boiling will escape through the port hole 33 in the neck of the pot; this may also be accomplished by a pressure valve in place of the port hole 33.

When the coffee has percolated sufficiently for serving, release the push rod so that its bottom will fall on top of the tube 13. The diameter of the push rod 2 is greater than is the diameter of the hollow piston rod 13. Now, holding a container in front of the spout 11 with one hand, exert pressure on top of the push rod button 1 with palm or thumb of the other hand. This pressure will force the piston rod 13 and piston 19 downward. When the piston is forced below the upper extremity of the lower cylindrical surface of the pot shown in the drawings by 14—14' the liquid in the compression chamber will be forced up into the hollow tube 13 through the orifice 23 into the tube 12 and through that tube into the container held before the spout by way of the spout of the pot.

It is thus seen that for dispensing liquid it is merely necessary to press down on the button 1 and the pump like action of tube 13 and its attached disc 19 causes the coffee to pass up the tube 13 and out through the orifice 23, through the intermediary tube 12 and through spout 11 out into a container held in front of the spout.

Having thus described my invention I declare as new and desire to secure by Letters Patent, the following:

1. A percolator coffee pot comprising a receptacle adapted to contain water, a cover for said receptacle, a piston disposed adjacent the bottom of said receptacle, a tubular member forming a piston rod for said piston extending from the latter, a container for coffee grounds mounted within said receptacle and having a central tubular portion receiving said tubular member therethrough, a member slidably mounted on said cover adapted to contact the upper end of said tubular member, a spout extending from said receptacle, said tubular member having an opening normally registering with said tubular portion whereby liquid rising within said tubular member will pass through the upper end thereof into said container, and means for establishing communication between the tubular member and said spout upon actuating said slidable member for moving the tubular member to bring said opening therein below said container.

2. A percolator coffee pot comprising a receptacle adapted to contain liquid and having a neck portion, a cover for said receptacle mounted on said neck portion, a compression spring disposed at the bottom of said receptacle, a piston resting on said spring, a tubular member extending upwardly from said piston communicating with the portion of said receptacle below said piston, a container for coffee grounds having a central tubular portion receiving said tubular member therethrough and mounted within the neck portion of said receptacle, a spout mounted on said receptacle and extending therefrom, the upper end of said tubular member being disposed above said container whereby liquid flowing upwardly within said tubular member will pass to said container, and means for automatically establishing communication between said tubular member and said spout upon depressing said tubular member and piston against the pressure of said spring.

3. A percolator coffee pot comprising a receptacle adapted to contain liquid and having a neck portion, a compression spring disposed at the bottom of said receptacle, a piston resting on said spring, a tubular member extending upwardly from said piston communicating with the portion of said receptacle below said piston, a container for coffee grounds having a central tubular portion receiving said tubular member therethrough and mounted within the neck portion of said receptacle, a spout mounted on said receptacle and extending therefrom, the upper end of said tubular member being disposed above said container whereby liquid flowing upwardly within said tubular member will pass to said container, and means for automatically establishing communication between said tubular member and said spout upon depressing said tubular member and piston against the pressure of said spring, said means comprising a member slidably mounted on said cover and having a portion adapted to contact the upper open end of said tubular member.

4. In combination, a receptacle adapted to contain water, a cover non-slidably mounted thereon, a spout fixed to said receptacle, means within said receptacle for percolating coffee, and means for pumping percolated coffee from said receptacle through said spout, said means comprising a member slidably mounted on said cover adapted to engage a portion of said percolating means.

5. A percolator coffee pot comprising a receptacle adapted to contain water, said receptacle having a neck portion, a cover for said receptacle non-slidably mounted on said neck portion, means for percolating coffee within said receptacle comprising a piston and a tubular piston rod disposed within said receptacle, and a container for coffee grounds mounted within the neck of said receptacle and having a tubular portion slidably receiving said tubular piston rod, said tubular piston rod having an opening in the wall thereof covered and uncovered by said tubular portion of said container, and a spout fixed to said receptacle and having an open portion slidably contacting said tubular piston rod, and means for moving said piston and piston rod for bringing the opening in said tubular piston rod into registration with said open end of said spout.

6. A percolator coffee pot comprising a receptacle adapted to contain water, said receptacle having a neck portion, a cover for said receptacle non-slidably mounted on said neck portion, means for percolating coffee within said receptacle comprising a piston and a tubular piston rod disposed within said receptacle, and a container for coffee grounds mounted within the neck of said receptacle and having a tubular portion slidably receiving said tubular piston rod, said tubular piston rod having an opening in the wall thereof covered and uncovered by said tubular portion of said container, and a spout fixed to said receptacle and having an open portion slidably contacting said tubular piston rod, and means for moving said piston and piston rod for bringing the opening in said tubular piston rod into registration with said open end of said spout, and means for preventing sliding movement of said container within said receptacle.

7. In combination, a receptacle adapted to contain water, a spout fixed to said receptacle, a container for coffee grounds mounted in said receptacle, a tubular member disposed within said receptacle and extending through said container, and a member slidably mounted on said receptacle for moving said tubular member.

8. A percolator coffee pot comprising a receptacle, a container for coffee grounds mounted therein, a spout fixed to said receptacle, a tubular member mounted within said receptacle adapted to form a passage for carrying liquid to said container, and means for preventing liquid from passing from said tubular member to said container and establishing communication between said tubular member and said spout.

9. A percolator coffee pot comprising a receptacle, a container for coffee grounds mounted therein, a spout fixed to said receptacle, a tubular member mounted within said receptacle adapted to form a passage for carrying liquid to said container, and means for preventing liquid from passing from said tubular member to said container and establishing communication between said tubular member and said spout, said means including a member slidably mounted on said receptacle and adapted to contact the upper end of said tubular member.

ISRAEL GROMETSTEIN.